US010577037B2

(12) United States Patent
Arduino et al.

(10) Patent No.: US 10,577,037 B2
(45) Date of Patent: Mar. 3, 2020

(54) SYSTEM AND CORRESPONDING PROCESS FOR GLUING TOGETHER TWO COMPONENTS ON A VEHICLE-BODY ASSEMBLY LINE

(71) Applicant: Comau S.p.A., Grugliasco (Turin) (IT)

(72) Inventors: Stefano Arduino, Grugliasco (IT); Giovanni Di Stefano, Grugliasco (IT); Valeria Serpi, Grugliasco (IT)

(73) Assignee: Comau S.p.A., Grugliasco (Turin) (IT)

( * ) Notice: Subject to any disclaimer, the term of this patent is extended or adjusted under 35 U.S.C. 154(b) by 0 days.

(21) Appl. No.: 15/770,508

(22) PCT Filed: Oct. 27, 2016

(86) PCT No.: PCT/IB2016/056452
§ 371 (c)(1),
(2) Date: Apr. 24, 2018

(87) PCT Pub. No.: WO2017/072681
PCT Pub. Date: May 4, 2017

(65) Prior Publication Data
US 2018/0312727 A1 Nov. 1, 2018

(30) Foreign Application Priority Data
Oct. 27, 2015 (EP) ..................................... 15191738

(51) Int. Cl.
*B62D 65/02* (2006.01)
*C09J 5/06* (2006.01)
(Continued)

(52) U.S. Cl.
CPC .............. *B62D 65/02* (2013.01); *B21J 15/02* (2013.01); *B23P 19/04* (2013.01); *B62D 65/022* (2013.01); *C09J 5/06* (2013.01)

(58) Field of Classification Search
CPC ........ B62D 65/02; B62D 65/022; B21J 15/02; C09J 5/06; B29C 66/91; B29C 66/912;
(Continued)

(56) References Cited

U.S. PATENT DOCUMENTS 5,123,161 A 6/1992 Kubo et al.
5,143,270 A 9/1992 Hamada et al.
(Continued)

FOREIGN PATENT DOCUMENTS

DE 199 41 996 A1 3/2001
DE 10061309 A1 6/2002
(Continued)

*Primary Examiner* — George R Koch
(74) *Attorney, Agent, or Firm* — Young Basile Hanlon & MacFarlane, P.C.

(57) ABSTRACT

A system and process for gluing two components together includes measuring the temperature of one or both panels to be glued together prior to application of the glue to the panels. If the measured temperature of the panel(s) is outside a predetermined range, the system and process thermally conditions the panel(s) to bring them into the predetermined temperature range for proper adhesion. A control unit with predetermined reference values is in communication with the system temperature sensors and thermal conditioning devices to provide uniform gluing quality irrespective of the environmental conditions of the assembly line.

12 Claims, 1 Drawing Sheet

(51) Int. Cl.
*B21J 15/02* (2006.01)
*B23P 19/04* (2006.01)

(58) Field of Classification Search
CPC .......... B29C 66/9121; B29C 66/91221; B29C 66/914; B29C 66/9141; B29C 66/91411
See application file for complete search history.

(56) References Cited

U.S. PATENT DOCUMENTS

| | | |
|---|---|---|
| 5,184,766 A | 2/1993 | Takahashi et al. |
| 5,267,683 A | 12/1993 | Hamada et al. |
| 5,287,913 A | 2/1994 | Dunning et al. |
| 5,400,943 A | 3/1995 | Rossi |
| 5,940,961 A | 8/1999 | Parete |
| 5,943,768 A | 8/1999 | Ray |
| RE36,541 E | 2/2000 | Rossi |
| 6,026,881 A | 2/2000 | Durso |
| 6,170,732 B1 | 1/2001 | Vogt et al. |
| 6,438,842 B1 | 8/2002 | Raami |
| 6,467,675 B1 | 10/2002 | Ozaku et al. |
| 6,493,930 B1 | 12/2002 | Raami |
| 8,806,739 B2 | 8/2014 | Magni et al. |
| 8,950,647 B2 | 2/2015 | Magnano et al. |
| 9,278,410 B2 | 3/2016 | Magnano et al. |
| 2003/0057256 A1 | 3/2003 | Nakamura et al. |
| 2003/0115746 A1 | 6/2003 | Saito et al. |
| 2005/0017057 A1 | 1/2005 | Motomi et al. |
| 2005/0035175 A1 | 2/2005 | Nakamura et al. |
| 2006/0053932 A1 | 3/2006 | Sturm |
| 2006/0179628 A1 | 8/2006 | Sturm |
| 2006/0236518 A1 | 10/2006 | Baulier |
| 2006/0242823 A1 | 11/2006 | Kilibarda |
| 2006/0245901 A1 | 11/2006 | Yamaoka et al. |
| 2008/0116247 A1 | 5/2008 | Kilibarda |
| 2008/0148546 A1 | 6/2008 | Monti et al. |
| 2008/0295335 A1 | 12/2008 | Kilibarda et al. |
| 2009/0050679 A1 | 2/2009 | Gauggel |
| 2009/0245930 A1 | 10/2009 | Baulier et al. |
| 2009/0285666 A1 | 11/2009 | Kilibarda |
| 2011/0011918 A1 | 1/2011 | Kelley |
| 2011/0265301 A1 | 11/2011 | Kilibarda |
| 2012/0137490 A1 | 6/2012 | Kweon et al. |
| 2012/0304446 A1 | 12/2012 | Kilibarda |
| 2015/0034703 A1 | 2/2015 | Tanaka et al. |
| 2017/0066143 A1* | 3/2017 | Hantzschel ............. B23P 19/04 |

FOREIGN PATENT DOCUMENTS

| | | |
|---|---|---|
| DE | 10164409 A1 | 7/2003 |
| EP | 1918182 A1 | 5/2008 |

* cited by examiner

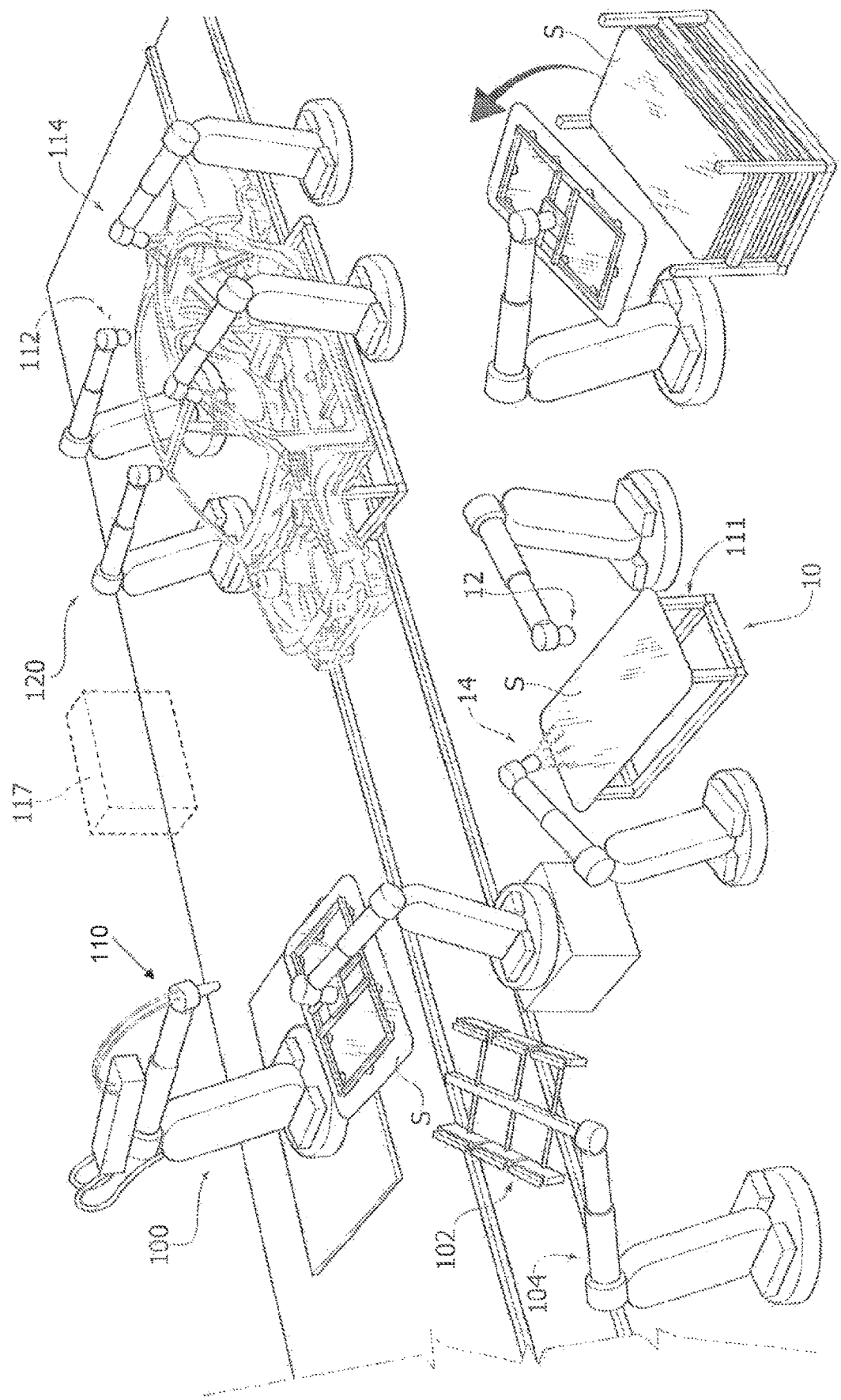

SYSTEM AND CORRESPONDING PROCESS FOR GLUING TOGETHER TWO COMPONENTS ON A VEHICLE-BODY ASSEMBLY LINE

This application is a 371 of PCT/IB2016/056452, filing date Oct. 27, 2016.

TECHNICAL FIELD

The present invention relates to a system and the corresponding process for gluing together two components on a vehicle-body assembly line.

BACKGROUND

In this context, in fact, increasingly common is the use of glues instead of the more conventional welding technique, above all as regards assembly of motor-vehicle bodies. Connection via glues enables, in fact, connection together also of non-metal parts and, consequently, enables introduction, in the composition of the body, of new materials, such as carbon fibres, fibreglass, and polymeric materials in general.

The above methodology presents a series of critical aspects that have been already identified and tackled by known gluing systems. For instance, in the use of thermally activated glues, once the two components have been coupled with the layer of glue set in between, it is of fundamental importance to ensure that the glue reaches a predetermined temperature and maintains it for a sufficient time for the cross-linking process, designed to establish the connection between the two components, to be completed. In this connection, the German document No. DE19941996A1 describes, for example, a gluing system that envisages heating units having the function of operating on the two components already glued together so as to initiate and bring the aforesaid cross-linking process to a given stage such that it will then be possible to handle the two components assembled together, throughout the subsequent stations of the assembly line, without any risk of detachment of the two components.

Once again as regards the problem of cross-linking of the glue, the German document No. DE19941996A1 describes a head for application of glue carried by a robot arm, which is equipped with heating means, which operate for heating the glue, immediately after it has been applied on the component.

SUMMARY

In the context outlined above, the present applicant has found that it is, in general, possible to improve the known gluing processes, by carrying out a measurement of the temperature of at least one of the components to be glued and performing a corrective action on one or more parameters of the assembly process on the basis of the temperature detected.

In particular, the present applicant has understood that, by identifying the temperature of the component as a process-control parameter and by implementing appropriate interventions on the process, as a function of the value of this parameter, it is possible to guarantee a uniform quality of the assemblies obtained, whatever the environmental conditions of the assembly line.

Now, in general, the process described herein comprises the following steps:

providing a first component and a second component;
applying a layer of glue on said first component and/or on said second component;
coupling together said first and second components, with said layer of glue set in between; and
possibly heating said layer of glue applied on said first component and/or on said second component so as to activate thermally a reaction of cross-linking and/or curing of said glue.

In this connection, it should be noted that the latter step may or may not be envisaged according to the type of glue used, i.e., according to whether this requires or not a thermally induced chemical activation, such as in the case of bi-component glues.

The above process is characterized in that, before applying said layer of glue on said first and second components, it moreover envisages the following steps:

measuring the temperature of the first component and/or of the second component; and
thermally conditioning the first component and/or the second component via heat-conditioning means controlled on the basis of the temperature measured so as to bring at least the parts or portions of said first component and/or said second component on which the glue will be applied to a pre-set temperature, even before said layer of glue is applied on said parts or portions.

Control of the temperature of the components described herein stems from the observation that the components to be assembled may in general present temperatures that vary widely according to a whole series of conditions and situations that are far from easy to foresee and control, such as the seasons of the year, the path of advance of the individual components within the apparatus, the place of storage of the components, etc. This marked variability may jeopardize the gluing process and the quality of the assembly obtained since this process is in any case set up with reference to environmental conditions identified as standard.

In this context, the function of the heat conditioning provided in the process described herein is hence to bring the components into a predetermined thermal state designed to guarantee a correct performance—in controlled and repeatable conditions—of the gluing step. Measurement of the temperature clearly has the function of identifying those states that diverge from the pre-set thermal state and is preferably carried out on both components. It should be noted that the above steps of temperature measurement and conditioning precede not only gluing of the two components but also the very application of the glue thereon and are performed even though the process described herein may possibly envisage a step of heating of the glue, subsequent to its application, to activate it thermally.

BRIEF DESCRIPTION OF THE DRAWINGS

The invention is best understood from the following detailed description when read in conjunction with the accompanying drawings.

FIG. 1 is a schematic perspective view of an example of the invention.

DETAILED DESCRIPTION

By way of example, a possible application of the process disclosed herein will now be described in the framework of a system for assembly of the roof on a motor-vehicle frame.

As will become evident in what follows, the assembly system is appropriately prearranged precisely for carrying out the process in question.

Illustrated in FIG. 1 is a gluing station 100, which is equipped with an auxiliary workstation 10 for aid to the gluing process, which envisages a supporting structure 111, rested on which is the panel or roof S after it has been picked up from a magazine structure. The auxiliary workstation envisages sensor means 12 for measuring the temperature of the panel. These means may, for example, be constituted by infrared sensors. Preferably, the sensors 12 are carried by a mobile structure, for example a robot arm, in order to be able to detect the temperature in different points of the panel. The sensors in question may in any case also be carried by a fixed structure, and in this case are designed to detect the temperature more or less always in one and the same point of the various panels that are set on the support structure 111. In alternative embodiments, these sensor means are, instead, constituted by a thermographic camera via which a complete mapping of the temperature is obtained for extensive portions of the panel.

The workstation 10 in question further comprises means 14 for heat conditioning of the panel, which, according to the specific applications, may envisage either a heating unit or a cooling unit, or else a unit of each type. In the case of a heating unit, this may be constituted by one or more infrared emitters, air blowers, or blowers of heated gas, etc. In the case of a cooling unit, this may be constituted, for example, by one or more fans. Preferably, these heat conditioning means are carried by mobile structures, for example, also in this case, by robot arms, to be able to concentrate selectively their action on different parts of the panel.

The system moreover envisages a control unit 117, which is configured for controlling the heat conditioning means referred to above on the basis of the temperature detected by the sensor means, to bring the part of the panel that will come into contact with the layer of glue to a pre-set temperature. These conditioning means intervene only when necessary, i.e., when the measured temperature of the panel indicates that the latter is at a temperature different from the aforesaid pre-set temperature.

The purpose of the action of these heat conditioning means is to bring the panel into a predetermined thermal state for which it is possible to guarantee proper performance—in controlled and repeatable conditions—of the gluing step. In this connection, the present applicant has, in fact, noted that the thermal inertia of the panel is alone able to affect dramatically the gluing process, instantaneously varying the temperature of the glue as soon as this is applied on the component even in the cases where the glue is, for example, heated before being applied or else immediately after. Detection of the temperature of the component and the possible conditioning action provided by the aforesaid heat conditioning means hence guarantees the conditions necessary for the gluing process to be carried out properly.

In various embodiments, the control unit 117 has, stored within it, one or more reference values and is configured for setting in relation the temperatures measured with these reference values and for determining the active and inactive states of the heat conditioning means on the basis of the relation determined between the temperatures measured and the reference values. In various preferred embodiments, the control unit 117 has a temperature range stored within it and is configured for controlling the action of the heat conditioning means 14 if and as long as the measured temperature of the component, in the specific case the temperature of the panel, does not fall within the above range.

Furthermore, the control unit 117 may be configured for adjusting the operating parameters of the aforesaid heat conditioning means 14 according to the temperatures measured in order to adapt the times of the operations of the system to pre-set cycle times irrespective of the actual temperatures detected on the components. The parameters in question may be represented by the electric power consumption, the rate of displacement of the conditioning means with respect to the panel, the duration of the action of these means, etc.

By way of example, in the stage of setting up the system, it is hence possible to identify, for the different temperatures at which the panel could be during operation that do not correspond to the aforesaid pre-set state, a series of active states and corresponding operating parameters of the heat conditioning means that enable the panel to be brought into said pre-set state within pre-set times. This setting-up stage may preferably generate one or more control maps that associate to a set of values indicating the temperatures measured corresponding values and/or states of one or more of the operating parameters of the conditioning means.

In various preferred embodiments, as in the one illustrated, upstream of the gluing station there may also be provided a station 120 for preparation of the body, which is prearranged for verifying the temperature of the body and possibly for intervening in order to change the thermal state thereof, in particular of the parts of the frame that are to receive the panel in view, that is, of the subsequent gluing operation. For this purpose, the station 120 comprises sensor means 112 and conditioning means 114 of the same type as the ones described above with reference to the station 10. Likewise, the control unit described above, or a further control unit, is configured for controlling the conditioning means 114 on the basis of the temperatures detected by the sensor means 112, once again in order to ensure that the gluing process will be carried out in the pre-set thermal conditions. It should be noted that alternatively it is also possible to provide the measuring means and the conditioning means described above at the gluing station itself. In this case, it is possible to integrate these means directly in the devices with which the station is already equipped for carrying out the gluing operations. In various embodiments, the system may also envisage variation of the parameters themselves of the gluing process on the basis of the detected temperatures of the body and/or of the panel, in the case of possible thermal conditions different from the pre-set state referred to above, in this case so as to compensate indirectly for the aforesaid different conditions with an appropriate modification of the specific way in which the gluing operation is carried out. For instance, the system may appropriately vary the temperature, amount, density, etc. of the glue delivered, or else the areas on the component where the glue is applied. This intervention by the system on control of the gluing operation plays an auxiliary role in the interventions indicated implemented by the conditioning means.

To return now to FIG. 1, after the panel and the body have undergone temperature detection and after they have possibly been thermally conditioned, they can hence be assembled together, in the gluing station 100.

This station has conventional means 110 for applying the glue on the parts of the body that will receive the panel. In various preferred embodiments, as in the one illustrated, these conventional means are represented by a manipulator robot, which carries a head for controlled delivery of the glue. These means may, however, clearly be constituted by any other device or system conventionally used in the art for the functions referred to.

Furthermore, the gluing station 100 comprises a unit 102 that is also carried by a manipulator robot 104 and has the function of heating the glue present between the two components assembled together in order to activate it thermally. In various preferred embodiments, the unit 102 envisages a single frame carried by the robot 104, connected on which is a series of infrared sources. Also in this case, these heating means may, however, clearly be constituted by any other device or system conventionally used in the art for the functions referred to. The system described above is able to implement a process of controlled gluing always in pre-set conditions, so as to guarantee a uniform quality of the assemblies obtained irrespective of the environmental conditions in which the line is operating. In this connection, it should be noted that, for environmental conditions of the assembly line not corresponding to the optimal ones, the known gluing systems have, instead, so far revealed marked critical aspects, if not malfunctioning. The present applicant has, for example, been able to note the occurrence of cases where the line has not been able to operate at all because it is not able to carry out the gluing operations properly, this immediately after a prolonged interruption of activity on account of a holiday period, which has fallen in concomitance with weather conditions characterized by particularly low temperatures, below 0° C. These problems manifested by known gluing systems then obviously have repercussions upon the throughput and on the manufacturing quality of the entire line.

Clearly, the specific configuration of the apparatus may in any case vary from the one illustrated and described above, according to the specific needs and peculiarities of the various applications. For instance, in alternative embodiments, it is possible to envisage that it is the unit 102 itself carried by the robot 104 that carries out preliminary conditioning of the panel, as well as heating of the glue after the two components have been assembled together. Once again in these alternative embodiments, the panel, instead of being fed to the gluing station directly from a magazine, may be brought to the gluing station by the body itself, so that in this case it will be picked up from the body at the gluing station and brought into a workstation immediately adjacent to the line for conveying the body, to be heated by the unit 102. In these embodiments, the workstation 10 referred to previously will hence envisage, unlike the one illustrated in the drawings, only the sensor means 12 and a device for picking up the panel from the body and laying it back thereon after it has been conditioned.

Finally, it may be noted that the control units referred to above in general form part of the control system of the assembly apparatus. These units may be constituted by one or more modules that are physically connected or separate and are set in the proximity of, or else in a position remote from, the sensors and/or actuators that are involved in the process that these units control.

Of course, without prejudice to the principle of the invention, the details of construction and the embodiments may vary, even significantly, with respect to what is illustrated herein purely by way of non-limiting example, without thereby departing from the scope of the invention, as this is defined in the annexed claims.

The invention claimed is:

1. A process for gluing two components on a vehicle-body assembly line, comprising the steps of:
providing a first component and a second component;
applying a layer of glue on at least one of said first component or on said second component in a gluing station; and
coupling together said first and second components in said gluing station, with said layer of glue set in between said first and second components;
heating said layer of glue applied on said at least one of the first component or the second component so as to activate thermally a reaction of at least one of cross-linking or curing of said glue;
said process being characterized in that, before applying said layer of glue on said at least one of said first or second components, the process further comprising:
measuring a component temperature of said at least one of the first component or of the second component; and
thermally conditioning said at least one of the first component or the second component via heat-conditioning means controlled on the basis of the component temperature so as to bring at least a portion of said at least one of the first component or said second component on which the glue will be applied to a pre-set temperature, even before said layer of glue is applied on said parts, wherein the measuring the component temperature and the thermally conditioning of said at least one of the first or the second components occurs in one of an upstream station located upstream of said gluing station or in a workstation auxiliary to said gluing station designed to receive one of the first or the second components.

2. The process according to claim 1 wherein said system further comprises using a control unit that sets in relation the component temperature with one or more stored reference values and determines an active state or an inactive state of said heat-conditioning means according to the relation determined.

3. The process according to claim 2 further comprising varying of one or more parameters for applying the layer of glue on said at least one of said first component or on said second component on the basis of the component temperature, said one or more parameters comprising one of:
  (a) a glue temperature, a glue amount or a glue density; or
  (b) a predetermined area on said at least one of said first component or the second component where the layer of glue is to be applied.

4. The process according to claim 1 wherein said first component is a vehicle body and said second component is a vehicle roof.

5. The process according to claim 1 wherein said thermally conditioning step further comprises heating said at least one of said first component or said second component via a heating unit.

6. A system for assembly on a vehicle-body assembly line, the system for assembly comprising:
a station for gluing together a first component and a second component,
the gluing station including a device operable to apply a layer of glue on at least one of said first component or on said second component, said gluing station further including a heating device operable to heat said layer of glue applied to said at least one of said first component or said second component to activate thermally a reaction of at least one of cross-linking or curing of said layer of glue;
at least one temperature sensor operable to detect a component temperature of said at least one first component or of said second component;
at least one heat-conditioning unit, wherein said at least one temperature sensor and said at least one heat-conditioning unit are positioned in one of a station located upstream of the gluing station or in a workstation auxiliary to said gluing station designed to receive one of the first or the second components to receive the layer of glue; and a control unit configured for controlling said at least one heat-conditioning unit in order to heat condition said at least one of said first component or said second component on the basis of the component temperature detected by said at least one temperature sensor so as to bring at least a portion of said at least one of said first component or of said second component on which the layer of glue will be applied to a pre-set temperature before said layer of glue is applied on said portion.

7. The system according to claim 6 wherein said at least one heat-conditioning unit is supported by a manipulator robot.

8. The system according to claim 6 wherein said heat-conditioning unit comprises one of an infrared lamp or an air blower.

9. The system according to claim 6, wherein said at least one temperature sensor comprises one or infrared sensors or at least one thermographic camera.

10. The system according to claim 6 wherein said device for applying said layer of glue comprises a manipulator robot having a head operable to control the delivery of the layer of glue.

11. The system according to claim 6 wherein said heating device comprises a heating unit having one or more infrared lamps.

12. The system according to claim 11, wherein said heating unit is positioned in said gluing station.

* * * * *